United States Patent
Douglas (10) Patent No.: US 11,065,668 B2
(45) Date of Patent: Jul. 20, 2021

(54) METHOD AND APPARATUS FOR FORMING A NACELLE LEADING EDGE

(71) Applicant: Rohr, Inc., Chula Vista, CA (US)

(72) Inventor: Alan R. Douglas, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 184 days.

(21) Appl. No.: 16/264,763

(22) Filed: Feb. 1, 2019

(65) Prior Publication Data

US 2020/0246859 A1 Aug. 6, 2020

(51) Int. Cl.
| | |
|---|---|
| *F01D 25/24* | (2006.01) |
| *B21D 39/04* | (2006.01) |
| *B64F 5/10* | (2017.01) |
| *B23P 15/04* | (2006.01) |
| *B64D 29/00* | (2006.01) |

(52) U.S. Cl.
CPC .............. *B21D 39/04* (2013.01); *B23P 15/04* (2013.01); *B64F 5/10* (2017.01); *F01D 25/24* (2013.01); *B64D 29/00* (2013.01)

(58) Field of Classification Search
CPC .......... B21D 39/04; B21D 53/92; B23P 15/04
See application file for complete search history.

(56) References Cited

U.S. PATENT DOCUMENTS

| | | | | |
|---|---|---|---|---|
| 3,108,362 | A * | 10/1963 | Huet | ..................... B21C 37/298 |
| | | | | 29/890.052 |
| 7,334,447 | B1 | 2/2008 | Kulkarni et al. | |
| 7,340,933 | B2 | 3/2008 | Stewart | |
| 9,021,848 | B2 * | 5/2015 | Leacock | ................ B21D 53/92 |
| | | | | 72/296 |
| 9,975,162 | B2 | 5/2018 | Ludlow et al. | |
| 2011/0162429 | A1 | 7/2011 | Leacock | |
| 2016/0158820 | A1 * | 6/2016 | Ludlow | ..................... F02K 1/82 |
| | | | | 72/314 |
| 2018/0093316 | A1 | 4/2018 | Leacock | |
| 2018/0236526 | A1 | 8/2018 | Ludlow et al. | |

FOREIGN PATENT DOCUMENTS

WO     2012116999 A1     9/2012

OTHER PUBLICATIONS

EP search report for EP19212405.5 dated Jun. 9, 2020.

* cited by examiner

*Primary Examiner* — Jason L Vaughan
*Assistant Examiner* — Amanda Kreiling
(74) *Attorney, Agent, or Firm* — Getz Balich LLC (57) ABSTRACT

An apparatus for forming a nacelle leading edge includes an actuation assembly, a punch, and a die. The punch is in communication with the actuation assembly and annularly disposed about a first axis. The punch is configured to mate with an interior surface of a preform. The die is in communication with the actuation assembly and disposed within the first axis. The die is configured to retain an exterior surface of the preform. The actuation assembly is configured to effect relative motion between the punch and the preform. The actuation assembly is configured to offset the punch so that the punch is annularly disposed about a second axis, different than the first axis.

20 Claims, 8 Drawing Sheets

METHOD AND APPARATUS FOR FORMING A NACELLE LEADING EDGE

BACKGROUND

1. Technical Field

This disclosure relates generally to forming an annular part, and more particularly to forming a nacelle leading edge for a gas turbine engine.

2. Background Information

Formation of nacelle leading edges (i.e., nacelle lip skins) generally requires a multi-stage forming process, often requiring intermediate heat treatments. Nacelle leading edges may be produced by multiple stage deep drawings or spin forming processes, requiring complex and costly tooling. Formation of nacelle leading edges having an angular droop (e.g., nacelles having a scarf inlet) may further compound the previously discussed manufacturing difficulties.

SUMMARY

According to an embodiment of the present disclosure, a method for forming a nacelle leading edge is provided. A preform is positioned between a punch and a die. The punch and the die are annularly disposed about a first axis. At least one of the punch and the preform are moved, relatively, towards the other of the punch and the preform along the first axis so that a portion of the preform is formed over a leading edge of the punch. The punch is offset so that the punch is annularly disposed about a second axis, different than the first axis.

In the alternative or additionally thereto, in the foregoing embodiment, the punch is configured to mate with an interior surface of the preform and the die retains an exterior surface of the preform.

In the alternative or additionally thereto, in the foregoing embodiment, the method further includes, following offsetting the punch, moving at least one of the punch and the die towards the other of the punch and the die.

In the alternative or additionally thereto, in the foregoing embodiment, the method further includes moving, relatively, the die towards the punch along the first axis.

In the alternative or additionally thereto, in the foregoing embodiment, the method further includes moving, relatively, the punch towards the die along the second axis.

In the alternative or additionally thereto, in the foregoing embodiment, the die retains a first end of the preform and at least one clamp retains an opposing second end of the preform.

In the alternative or additionally thereto, in the foregoing embodiment, the method further includes positioning a preform holder about an interior surface of the preform opposite the die.

In the alternative or additionally thereto, in the foregoing embodiment, the first axis is an axial centerline of the preform.

In the alternative or additionally thereto, in the foregoing embodiment, the second axis is a centerline of the nacelle leading edge.

In the alternative or additionally thereto, in the foregoing embodiment, the preform includes a full annulus corresponding to the nacelle leading edge.

In the alternative or additionally thereto, in the foregoing embodiment, the preform includes a segment of a full annulus corresponding to the nacelle leading edge.

According to another embodiment of the present disclosure, an apparatus for forming a nacelle leading edge is provided. The apparatus includes an actuation assembly, a punch, and a die. The punch is in communication with the actuation assembly and annularly disposed about a first axis. The punch is configured to mate with an interior surface of a preform. The die is in communication with the actuation assembly and annularly disposed about the first axis. The die is configured to retain an exterior surface of the preform. The actuation assembly is configured to effect relative motion between the punch and the preform. The actuation assembly is configured to offset the punch so that the punch is annularly disposed about a second axis, different than the first axis.

In the alternative or additionally thereto, in the foregoing embodiment, the actuation assembly is configured to effect relative movement between the punch and the preform along the first axis and the second axis.

In the alternative or additionally thereto, in the foregoing embodiment, the actuation assembly is configured to move the die towards the punch along the first axis.

In the alternative or additionally thereto, in the foregoing embodiment, the apparatus further includes at least one clamp. The die is configured to retain a first end of the preform and the at least one clamp is configured to retain an opposing second end of the preform.

In the alternative or additionally thereto, in the foregoing embodiment, the apparatus further includes a preform holder configured to mate with an interior surface of the preform opposite the die.

In the alternative or additionally thereto, in the foregoing embodiment, the first axis is an axial centerline of the preform.

In the alternative or additionally thereto, in the foregoing embodiment, the preform includes a full annulus corresponding to the nacelle leading edge.

In the alternative or additionally thereto, in the foregoing embodiment, the preform includes a segment of a full annulus corresponding to the nacelle leading edge.

According to another embodiment of the present disclosure, an apparatus for forming a nacelle leading edge is provided. The apparatus includes an actuation assembly, a punch, and a die. The punch is in communication with the actuation assembly and annularly disposed about a first axis. The punch is configured to mate with an interior surface of a preform. The die is in communication with the actuation assembly and annularly disposed about the first axis. The die is configured to retain an exterior surface of the preform. The actuation assembly is configured to offset the punch so that the punch is annularly disposed about a second axis, different than the first axis. The actuation assembly is configured to at least one of effect relative movement between the die and the preform along the first axis and effect relative movement between the punch and the preform along one of the first axis and the second axis.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 1:
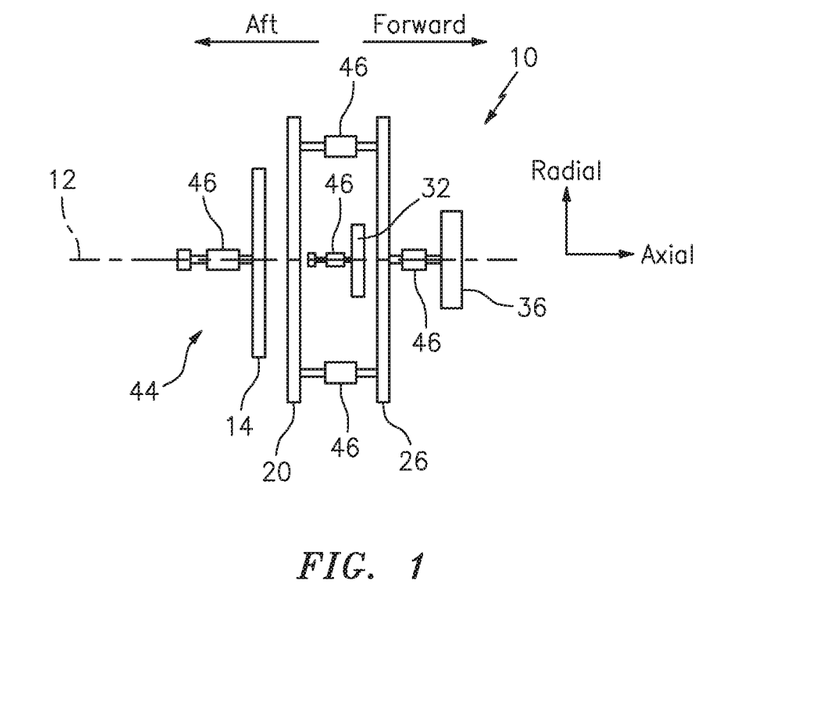
FIG. 1 is a schematic view of an apparatus for forming a nacelle leading edge.

Referring to FIG. 1, an apparatus 10 for forming a nacelle leading edge is illustrated. The apparatus 10 includes an annular punch 14 and a conic die 36 disposed along an axial centerline 12. Annular first and second clamps 20, 26 are configured to retain a preform 100 (not shown, see FIG. 2) between the punch 14 and the die 36. A conic preform holder 32 is configured to interface with the die 36 retaining the preform 100 therebetween. An actuation assembly 44 is in mechanical communication with the punch 14, the die 36, the clamps 20, 26, and the preform holder 32 via a plurality of actuation members 46. The actuation assembly 44 is configured to effect relative movement between one or more of the punch 14, the die 36, the clamps 20, 26, and the preform holder 32 by moving at least one of the components along one or more axes. The actuation assembly 44 is configured to offset (i.e., rotate or otherwise reposition such that the component is centered around a particular axis) one or more of the above-listed components from a first axis, such as the axial centerline 12 to a second axis. The actuation assembly 44 may move a single component at a given time or may move multiple components simultaneously. Additionally, the actuation assembly 44 may be a hydraulic, pneumatic, or electromechanical assembly or any other assembly suitable for providing relative motion between the above-described components.

Figure 2:
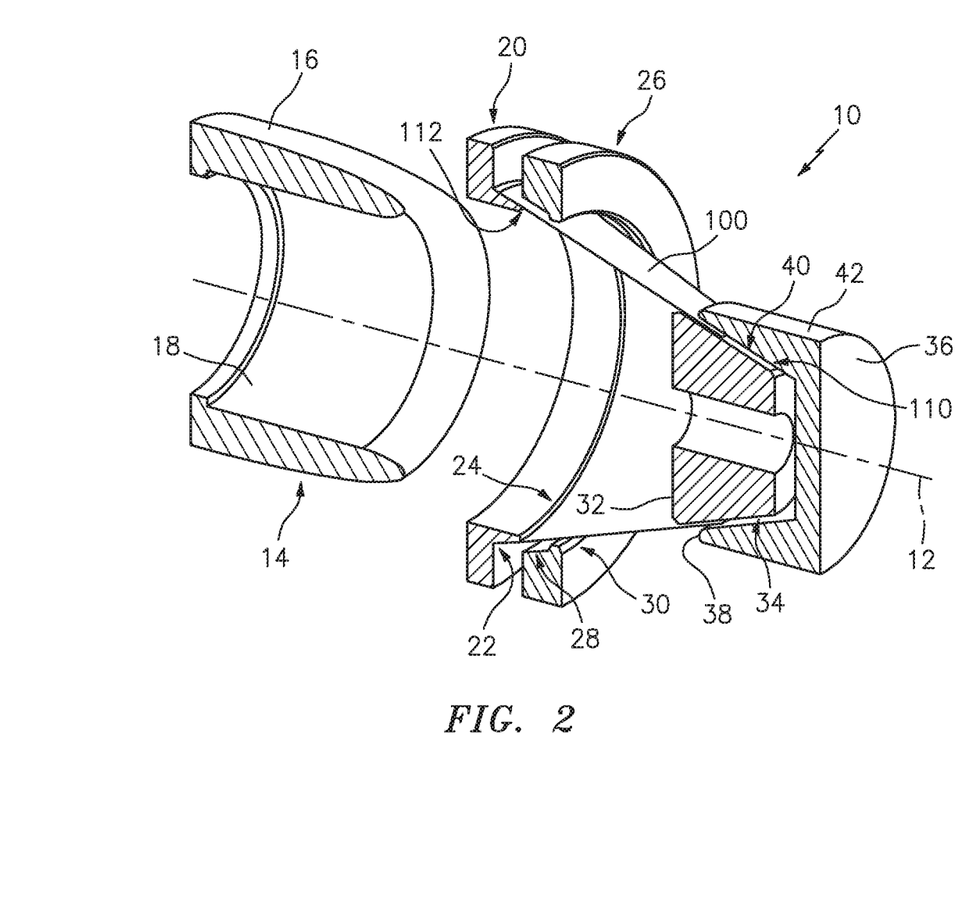
FIG. 2 is a sectional perspective view of the apparatus of FIG. 1.
Figure 3:
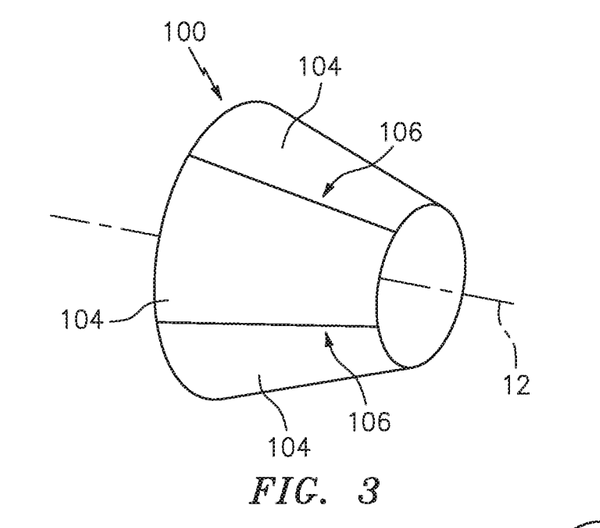
FIG. 3 is a perspective view of a plurality of sheet segments forming a frustoconical preform.
Figure 4:
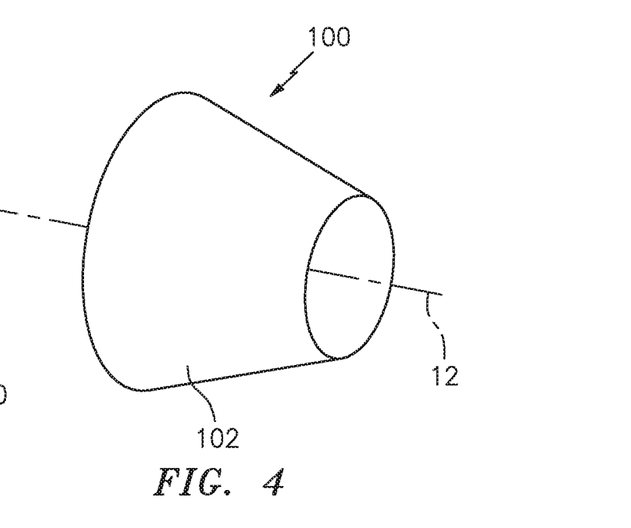
FIG. 4 is a perspective view of a single sheet forming a frustoconical preform.
Figure 14:
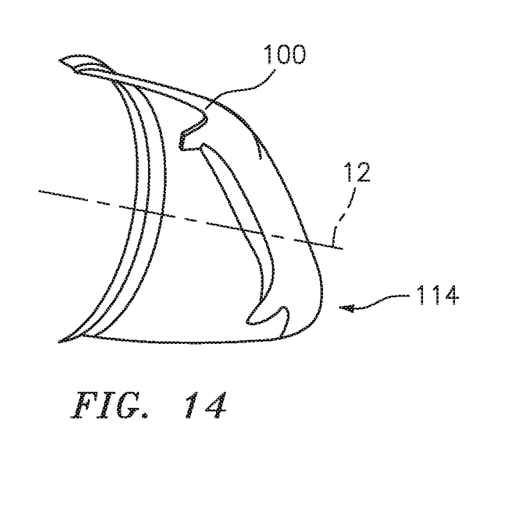
FIG. 14 is a sectional view of a preform at the second stage of the nacelle forming process.
Figure 15:
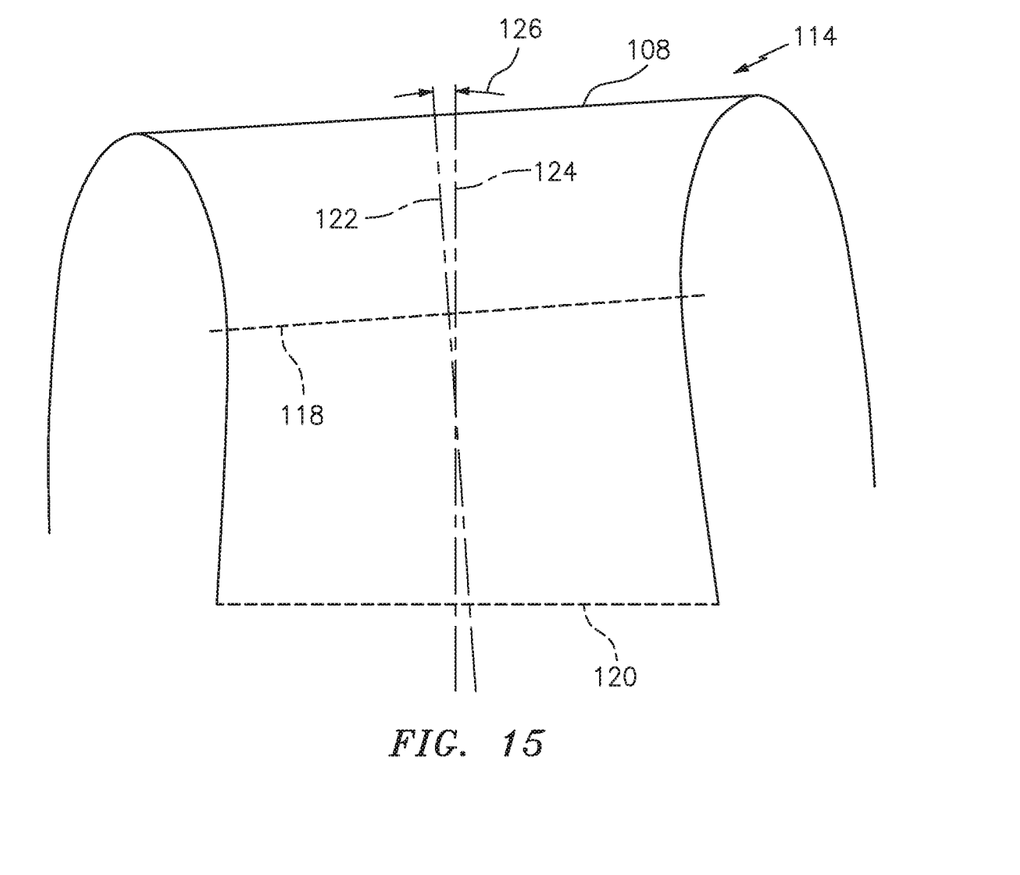
FIG. 15 is a cross-sectional view of a portion of a nacelle leading edge having an angular droop.

Referring to FIG. 2, the punch 14 has an external surface 16 shaped to conform to and mate with an internal surface of the preform 100 so as to define the internal surface of the finished, formed nacelle leading edge 114 (not shown, see FIG. 14). The external surface 16 is configured to reduce or prevent spring back and is of a high surface finish to reduce friction between the punch 14 and the preform 100 during forming. Friction may be further reduced by the application of lubricant during the nacelle forming process. An internal surface 18 of the punch 14 is configured to match the Inner Mold Line (IML) of the nacelle leading edge 114 with allowance for spring back if required. As will be discussed in further detail, the actuation assembly 44 moves the punch 14 along the axial centerline 12 and one or more additional axes, such as a second axis 50 (not shown, see, e.g., FIG. 9).

The first and second clamps 20, 26 are configured to grip an aft end 112 of the preform 100 between opposing grip faces 22, 28. The grip face 22 of the first clamp 20 includes a fillet radius 24 forming part of a lock bead assembly in conjunction with the second clamp 26. The fillet radius 24 may provide improved grip of the preform 100 thereby minimizing the chance of slippage and component failure. The grip face 28 of the second clamp 26 includes a fillet radius 30 configured to provide some material flow while minimizing the chance of failure and ensuring the conformity of the preform 100 to the external surface 16 of the punch 14. Both of the first and second clamps 20, 26 are sized to allow axial of the punch 14 through an interior of the clamps 20, 26. Motion of the first and second clamps 20, 26, effected by the actuation assembly 44, may be along the axial centerline 12 and one or more additional axes, such as the second axis 50 (not shown, see, e.g., FIG. 9). In some embodiments, the first and second clamps 20, 26 may be configured to remain stationary as the punch 14 pushes into and shapes the preform 100. In other embodiments, the first and second clamps 20, 26 may effect relative movement between the punch 14 and the preform 100 by, for example, pulling the preform 100 (e.g., in an aft direction) toward and around the punch 14.

Figure 9:
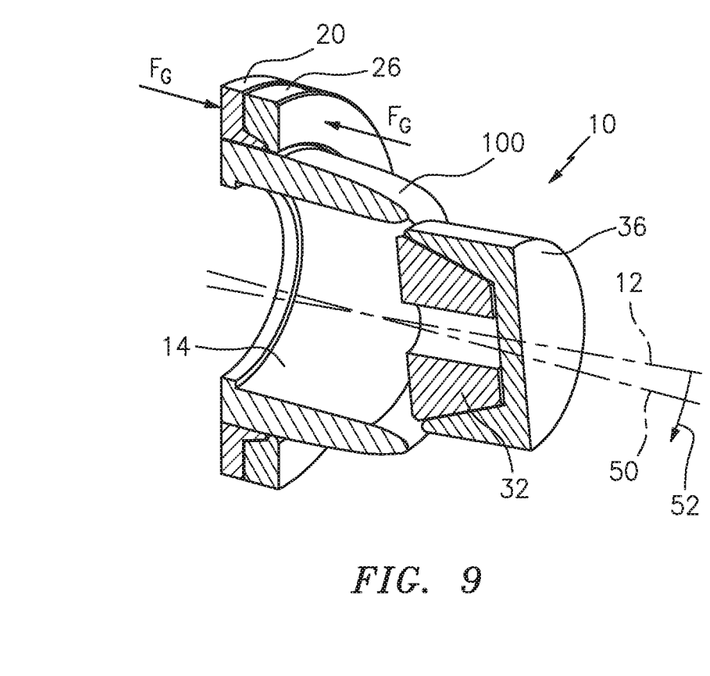
FIG. 9 is a sectional perspective view of the apparatus of FIG. 1 in a second stage of the nacelle forming process.

The die 36 includes a fillet radius 38 configured to control material flow during the nacelle forming process (e.g., a redraw process, see, e.g., FIG. 9). The fillet radius 38 may be adjustable to improve the nacelle forming process. The die 36 additionally includes an internal surface 40 and an external surface 42. In some embodiments, the internal surface 40 may be a conic section, however, the internal surface 40 may be changed depending on the severity of asymmetry in the external surface 16 and internal surface 18 of the punch 14. The external surface 42 of the die 36 may be configured to match the internal surface 18 of the punch 14 with a slight clearance for the preform 100. A taper of the internal surface 40 of the die 36 may be configured to match an external surface 34 of the preform holder 32. The actuation assembly 44 moves the die 36 along the axial centerline 12.

The preform holder 32 may be axially moved along the axial centerline 12 by the actuation assembly 44 to mate with the preform 100 opposite the die 36. The preform holder 32 may be configured to control the flow of the preform 100 by interfacing with the die 36 and also to provide a draw and/or redraw action relative to the axial motion of the punch 14. In some embodiments, the external surface 34 of the preform holder 32 may be a conic section, however, the external surface 34 may be changed depending on the severity of asymmetry in the external surface 16 and internal surface 18 of the punch 14. In some embodiments, the preform holder 32 and the die 36 may be in contact with the preform 100 throughout the nacelle forming process, while in other embodiments, one or both of the preform holder 32 and the die 36 may only be in contact with the preform 100 during a portion of the nacelle forming process.

Referring to FIGS. 2-5, in some embodiments, the preform 100 can be a single sheet 102 (e.g., a metal sheet having no joints or welds) or multiple sheet segments 104 welded together in, for example, a frustoconical shape (i.e., the preform 100 is a full annulus corresponding to a nacelle leading edge 114 (see FIG. 14)). The preform 100 including multiple sheet segments 104 may include a plurality of welded joints 106 between each of the sheet segments 104. The welded joints 106 may be formed using, for example, a friction stir welding process although linear friction and other welding techniques which maintain formability may also be used to form the preform 100. Following welding of the sheet segments 104 of the preform 100, an annealing process may be carried out.

In other embodiments, the preform 100 may include only a sheet segment 104 forming a portion of what will become the completed nacelle leading edge 114 (i.e., the preform 100 is a segment of a full annulus corresponding to a nacelle leading edge 114 (see FIG. 14). For example, the sheet segment may be any portion less than the complete 360-degree frustoconical shape of the preform 100 illustrated in FIGS. 3 and 4, e.g., 180 degrees, 120 degrees, 90 degrees, etc. Conducting the nacelle forming process with the preform 100 representing a portion of the frustoconical shape may be beneficial for larger engine nacelles (e.g., engine nacelles having an outer lip skin diameter of greater than 100 inches, for example, 100 to 160 inches).

Figure 6:
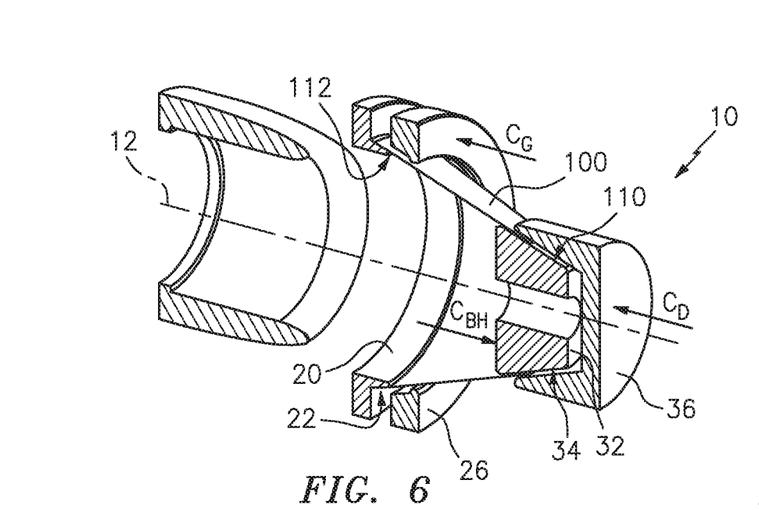
FIG. 6 is a sectional perspective view of the apparatus of FIG. 1 in a first stage of the nacelle forming process.

Referring to FIGS. 6, 11, 12, and 16, a first stage of a method 200 of forming a nacelle leading edge is illustrated. In particular, the first stage of the nacelle forming process may generally relate to the formation of the outer surface of the nacelle leading edge 114. The preform 100 is positioned in the apparatus 10 between the punch 14 and the die 36, each of the punch 14 and the die 36 are annularly disposed about the axial centerline 12 (see Step 202). The aft end 112 of the preform 100 may be positioned with an internal surface of the aft end 112 resting against the grip face 22 of the first clamp 20. In some embodiments, the forward end 110 of the preform 100 may be positioned with an internal surface of the forward end 110 resting against the external surface 34 of the preform holder 32. The preform holder 32 may be axially moved into position, by the actuation assembly 44 (not shown, see FIG. 1), within the preform 100. With the preform 100 correctly positioned on the first clamp 20, the second clamp 26 may be axially closed along the axial centerline 12 by the actuation assembly 44, as shown by linear actuation force $C_G$, towards the first clamp 20. In embodiments of the first stage wherein the preform holder 32 contacts the preform 100, the die 36 may be axially closed along the axial centerline 12 by the actuation assembly 44, as shown by linear actuation force CD, towards the preform holder 32 (as shown in FIG. 6). In some embodiments, the preform holder 32 may be displaced by linear actuation force $C_{BH}$. The aft end 112 of the preform 100 is shaped by clamping of the preform 100 between the first clamp 20 and the second clamp 26 (i.e., male and female members of a "lock bead assembly") into a stepped section 116.

Figure 7:
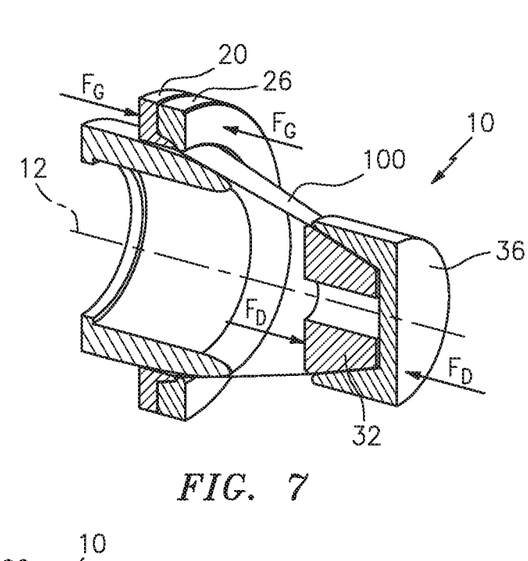
FIG. 7 is a sectional perspective view of the apparatus of FIG. 1 in the first stage of the nacelle forming process.

Referring to FIG. 7, an axial force $F_G$ is applied between the first clamp 20 and the second clamp 26 to maintain a strong grip on the preform 100 throughout the nacelle forming process. A separate axial force FD may be applied between the preform holder 32 and the die 36. The magnitude of the force FD may be adjusted throughout the nacelle forming process.

Figure 8:
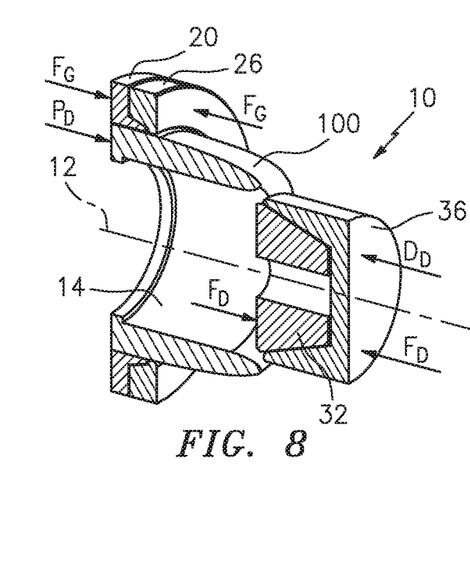
FIG. 8 is a sectional perspective view of the apparatus of FIG. 1 in the first stage of the nacelle forming process.
Figure 13:
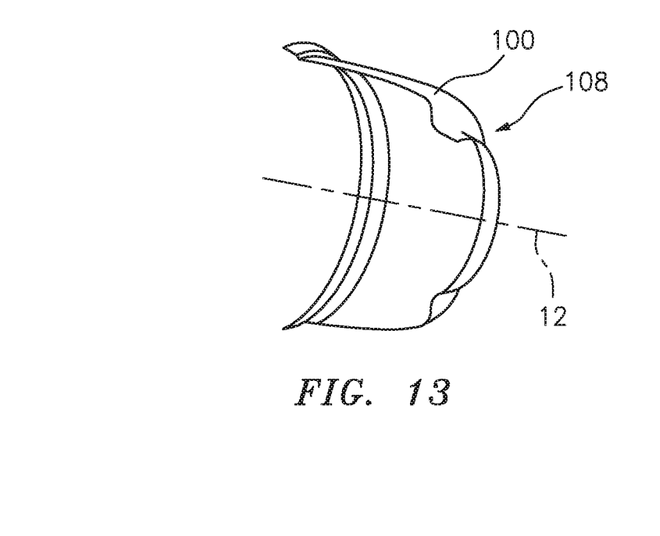
FIG. 13 is a sectional view of a preform at the first stage of the nacelle forming process.
Figure 16:
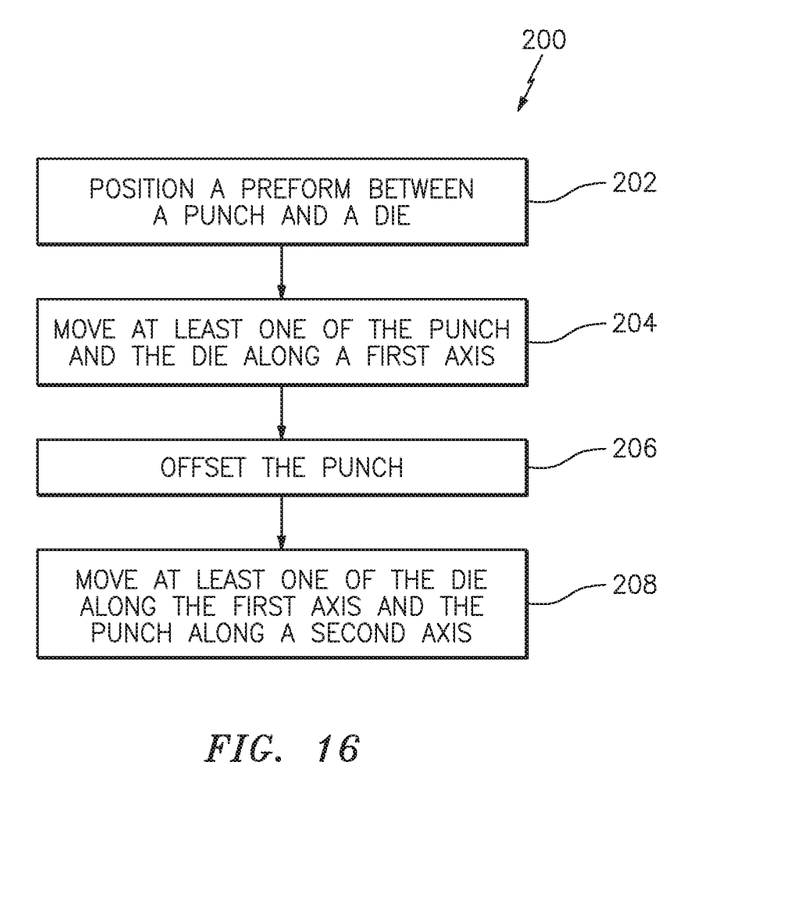
FIG. 16 is a flowchart for a method of forming a nacelle leading edge.

Referring to FIGS. 8, 13, and 16, a draw action of the nacelle forming process is illustrated. While maintaining $F_G$ and adjusting the magnitude of FD as required, the punch 14 is displaced axially along the axial centerline 12 in the direction of the taper of the die 36 by axial force PD so that a portion of the preform is formed over a leading edge of the punch 14 (see Step 204). The preform holder 32 and the die 36 may also be axially displaced during the draw action by axial force DD to ease the degree of radial stretch during the draw action, i.e., the punch 14 and the die 36 may be moved co-axially (see Step 204). The clamping force of the first clamp 20 and/or the second clamp 26 and/or the taper angle of the die 36, the preform 100, the preform holder 32, the first clamp 20, and/or the second clamp 26 may be adjusted to optimize the draw stage and minimize the chance of wrinkling while avoiding over stretching the material of the preform 100, thereby causing a fracture. The partially formed lip skin 108 formed with the preform 100, shown in FIG. 13, illustrates the configuration of the preform 100 following the draw action of the nacelle forming process. As discussed above, in some embodiments, axial motion of the first and second clamps 20, 26 (i.e., pulling the preform 100 over the punch 14) may effect sufficient relative movement between the preform 100 and the punch 14 to sufficiently form the preform 100 during the first stage.

Referring to FIGS. 9, 10, and 14-16, a second stage of the nacelle forming process is illustrated. In particular, the second stage of the nacelle forming process may generally relate to the formation of the inner surface of the nacelle leading edge 114. If not previously performed, preform holder 32 and the die 36 die may be directed by the actuation assembly 44 to mate with the preform 100. As shown in FIG. 9, the punch 14 and the first and second clamps 20, 26 may be offset from the axial centerline 12 so as to be annularly disposed about the second axis 50 which may correspond to an inlet centerline 122 (see FIG. 15) of the nacelle leading edge 114 (see Step 206). For example, while maintaining force $F_G$, the punch 14 and the first and second clamps 20, 26 may be rotated by the actuation assembly 44 in the direction of rotation 52 between the axial centerline 12 and the second axis 50.

Figure 10:
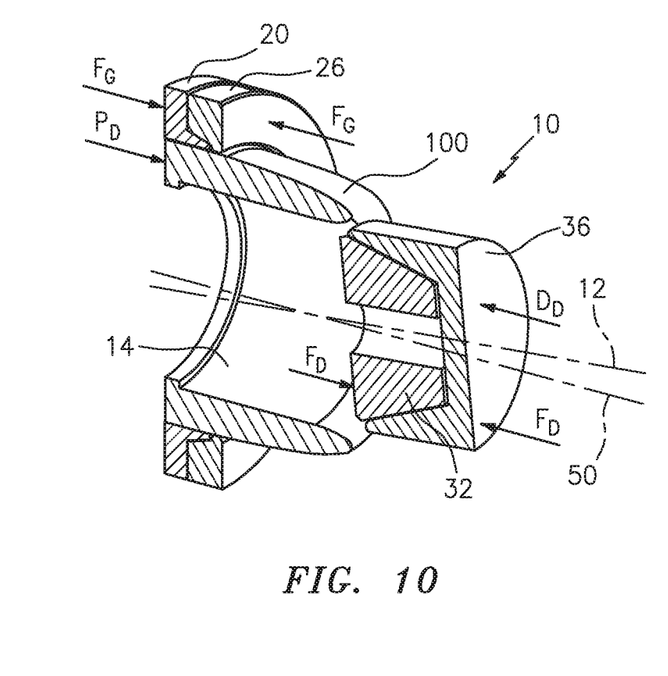
FIG. 10 is a sectional perspective view of the apparatus of FIG. 1 in the second stage of the nacelle forming process.
Figure 11:
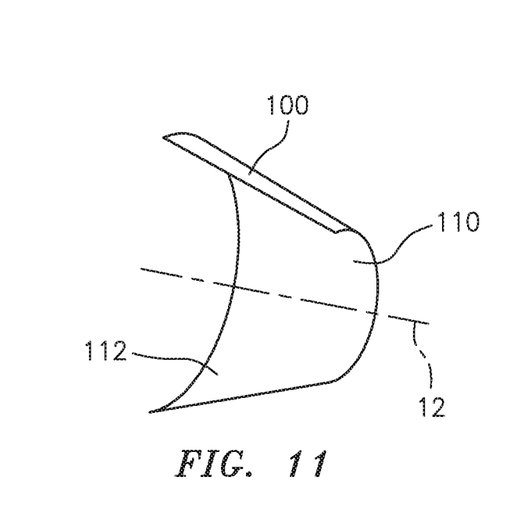
FIG. 11 is a sectional view of a preform at the first stage of the nacelle forming process.
Figure 12:
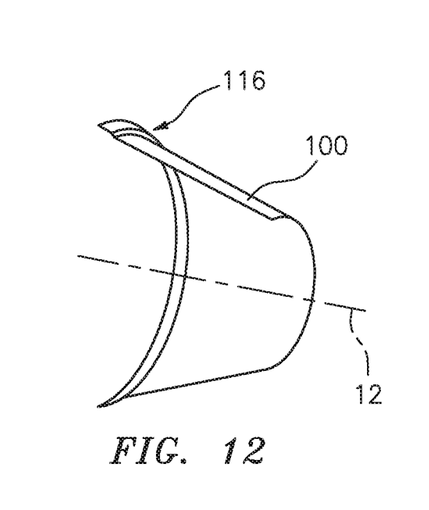
FIG. 12 is a sectional view of a preform at the first stage of the nacelle forming process.

As shown in FIG. 10, a redraw and/or stretching action of the nacelle forming process is illustrated. While maintaining $F_G$ and adjusting the magnitude of FD as required, the punch 14 is displaced along the second axis 50 in the direction of the die 36 by force PD directed along the second axis 50 (see Step 208). The preform holder 32 and the die 36 may be axially displaced along the axial centerline 12 in the direction of the punch 14 (see Step 208). When the above-discussed stages of the nacelle forming process are complete, the formed nacelle leading edge 114, as shown in FIG. 14, is removed from the nacelle forming apparatus 10.

Referring to FIG. 14, a portion of a nacelle leading edge 114 formed in accordance with the present disclosure is shown. The nacelle leading edge 114 has an inlet centerline 122 which may generally correspond to the second axis 50.

An engine interface 120 line illustrates the orientation of the nacelle leading edge 114 with respect to the gas turbine engine. As can be seen in FIG. 14, the inlet centerline 122 is offset from an engine centerline 124 thereby defining an angular droop of the nacelle inlet. An inlet trip line 118 may be generally perpendicular to the inlet centerline 54. In some embodiments, an angular offset 126 between the inlet centerline 122 and the engine centerline 124 may be between 2 and 10 degrees. In some other embodiments, the angular offset 126 may be between 0 and 20 or more degrees.

Figure 5:
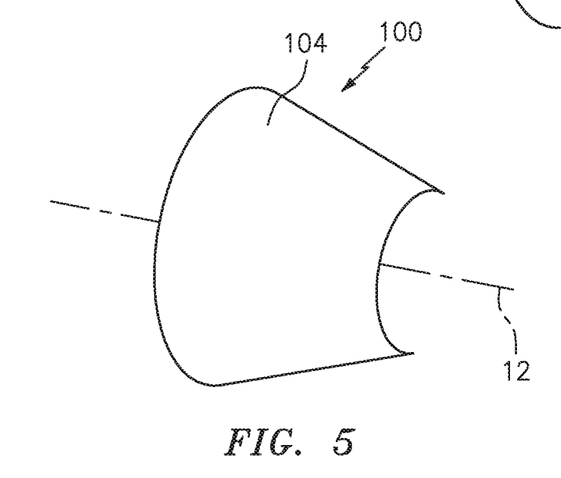
FIG. 5 is a perspective view of a preform.

Referring to FIGS. 5 and 14, in embodiments of the present disclosure wherein the preform 100 includes only a sheet segment 104 forming a portion of the nacelle leading edge 114, a plurality of the formed sheet segments 104 may be welded together to form the nacelle leading edge 114. The nacelle leading edge 114 may be formed using, for example, a friction stir welding process although linear friction and other welding techniques which maintain formability may also be used to form the preform nacelle leading edge 114 from the formed sheet segments 104. Following welding of the formed sheet segments 104 of the nacelle leading edge 114, an annealing process may be carried out.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A method for forming a nacelle leading edge, comprising:
   positioning a preform between a punch and a die, the punch and the die annularly disposed about a first axis;
   moving, relatively, at least one of the punch and the preform towards the other of the punch and the preform along the first axis so that a portion of the preform is formed over a leading edge of the punch; and
   rotating the punch so that the punch is annularly disposed about a second axis, different than the first axis.

2. The method of claim 1, wherein the punch is configured to mate with an interior surface of the preform and the die retains an exterior surface of the preform.

3. The method of claim 1, further comprising, following rotating the punch, moving at least one of the punch and the die towards the other of the punch and the die.

4. The method of claim 3, further comprising moving, relatively, the die towards the punch along the first axis.

5. The method of claim 3, further comprising moving, relatively, the punch towards the die along the second axis.

6. The method of claim 1, wherein the die retains a first end of the preform and at least one clamp retains an opposing second end of the preform.

7. The method of claim 1, further comprising positioning a preform holder about an interior surface of the preform opposite the die.

8. The method of claim 1, wherein the first axis is an axial centerline of the preform.

9. The method of claim 8, wherein the second axis is a centerline of the nacelle leading edge.

10. The method of claim 1, wherein the preform comprises a full annulus corresponding to the nacelle leading edge.

11. The method of claim 1, wherein the preform comprises a segment of a full annulus corresponding to the nacelle leading edge.

12. The method of claim 1, wherein the first axis intersects the second axis such that the first axis and the second axis define an angle therebetween.

13. An apparatus for forming a nacelle leading edge, comprising:
   an actuation assembly;
   a punch in communication with the actuation assembly and annularly disposed about a first axis, the punch configured to mate with an interior surface of a preform; and
   a die in communication with the actuation assembly and annularly disposed about the first axis, the die configured to retain an exterior surface of the preform;
   wherein the actuation assembly is configured to effect relative motion between the punch and the preform; and
   wherein the actuation assembly is configured to rotate the punch so that the punch is annularly disposed about a second axis, different than the first axis.

14. The apparatus of claim 13, wherein the actuation assembly is configured to effect relative movement between the punch and the preform along the first axis and the second axis.

15. The apparatus of claim 13, wherein the actuation assembly is configured to move the die towards the punch along the first axis.

16. The apparatus of claim 13, further comprising a preform holder configured to mate with an interior surface of the preform opposite the die.

17. The apparatus of claim 13, wherein the first axis is an axial centerline of the preform.

18. The apparatus of claim 13, wherein the preform comprises a full annulus corresponding to the nacelle leading edge.

19. The apparatus of claim 13, wherein the preform comprises a segment of a full annulus corresponding to the nacelle leading edge.

20. An apparatus for forming a nacelle leading edge, comprising:
   an actuation assembly;
   a punch in communication with the actuation assembly and annularly disposed about a first axis, the punch configured to mate with an interior surface of a preform; and
   a die in communication with the actuation assembly and annularly disposed about the first axis, the die configured to retain an exterior surface of the preform;
   wherein the actuation assembly is configured to rotate the punch so that the punch is annularly disposed about a second axis, different than the first axis; and
   wherein the actuation assembly is configured to at least one of effect relative movement between the die and the preform along the first axis and effect relative movement between the punch and the preform along one of the first axis and the second axis.

* * * * *